United States Patent [19]
Forsén

[11] Patent Number: 6,073,166
[45] Date of Patent: Jun. 6, 2000

[54] SYSTEM FOR TRANSFER OF DATA

[75] Inventor: Mats Forsén, Hisingsbacka, Sweden

[73] Assignee: Maila Nordic AB, Stockholm, Sweden

[21] Appl. No.: 08/950,062

[22] Filed: Oct. 14, 1997

[51] Int. Cl.[7] .................................................. G06F 13/00
[52] U.S. Cl. .............................................................. 709/206
[58] Field of Search ........................ 709/206; 395/200.36

[56] References Cited

U.S. PATENT DOCUMENTS

| | | | |
|---|---|---|---|
| 5,805,298 | 9/1998 | Ho et al. ................................. | 358/402 |
| 5,826,023 | 10/1998 | Hall et al. ................................ | 709/206 |
| 5,826,062 | 10/1998 | Fake, Jr. et al. ........................ | 707/513 |
| 5,832,208 | 11/1998 | Chen et al. ............................. | 713/201 |
| 5,892,905 | 4/1999 | Brandt et al. ........................... | 713/201 |
| 5,937,160 | 8/1999 | Davis et al. ............................ | 709/203 |

*Primary Examiner*—Kenneth R. Coulter
*Attorney, Agent, or Firm*—Mathews, Collins, Shepherd & Gould, P.A.

[57] ABSTRACT

The invention relates to a system for the transfer of data through the Internet comprising means for generating an Internet Mail including a MIME content, said MIME content comprising:

a) an address header,
b) a MIME content header,
c) a module of executable code, and
d) a section comprising data associated to said executable code.

Said module of executable code is derivable automatically for automatically starting the execution thereof together with the associated data when said Internet Mail is read.

8 Claims, 1 Drawing Sheet

SYSTEM FOR TRANSFER OF DATA

TECHNICAL FIELD

The invention relates to a system for the transfer of data through the Internet.

PRIOR ART

When transferring information from a sender to a receiver through the Internet and similar communication networks different techniques, formats and protocols are used. A specifically standardised method for such an information transfer is to use E-mail. A message containing textual information only is produced in a computer program. To such a message there can be added different types of attachments or enclosures that can be transferred separately or included in an aggregate mail. The message is transferred through the communication network, and it is then available on the receiving side by executing a computer program corresponding to the program used at the transmitting side, that is a program interpreting the message as intended by the sender. If the message contains textual information only it is directly readable through the computer program at the receiving side. The receiver program may be referred to as a user agent.

One type of attachment is documents that have been formatted in a word processing program and another type is images or drawings that have been formatted correspondingly in a design program or similar software. Presently available software at the receiving side will separate optional attachments, and some information about them, such as the file name of the attachment, will be available. On the condition that a computer program corresponding to the program that produced the document, that is capable of interpreting the document as intended by the sender, is available also at the receiving side it is possible to start such a program and open the document, thereby making the content of the attachment/document readable. Only on the condition that the program at the receiving side completely corresponds to the program used at the sending side for generating the document, normally with respect to the version of the program as well as to the platform on which the program is run, all information will be available to the receiver in the correct format. The same context platform is used for the type of computer or processor as well as the operating system used.

It is also known to include in an attachment an executable program, such as an executable WINDOWS program. In such a case the attached program is started separately. Also in this case it is imperative that the same platform is used, or that the sender has a sufficient knowledge about the platform used by the receiver, so as to allow the attached program to start in a correct way.

A standard used for transferring information that is more complex than plain text is MIME (Multipurpose Internet Mail Extension). Within the scope of MIME the encoding, transfer and decoding of different types of documents within an Internet Mail is defined. A MIME encoded message contains a Content-Type Header Field which declares the type of data and which is added by a User Agent of the Sender. The same of header fields is used by a User Agent of the Recipient to identify the document type.

One type of documents that can be transferred through is hypertext documents that are displayed by web browsers. Such documents are formatted in HTML, the HyperText Markup Language.

The elements, such as the structure, standards and protocols, of an Internet Mail are defined in a plurality of documents called RFCs (Request For Comments). According to existing RFCs different types of attachments are allowed. A user agent, that is a mail program, of the recipient optionally may have a capability of extracting attachments of a mail object. Different RFCs, such as RFC 821 and RFC 822, are applicable with regard to the invention.

One drawback inherent in the embodiments mentioned above is that one common platform or at least platforms that are carefully adapted to each other has to be used, so as to obtain the desired function. There also are strong limitations with regard to the level of automation when the information is received. Software required to interpret and display the information as intended by the sender has to be present or downloaded and started separately. New mail functionality implies repeated modifications of existing standards. Without such modifications the flexibility will be poor. The sender normally cannot control how the information sent will be interpreted or displayed by the receiver.

SUMMARY OF THE INVENTION

An object of the invention is to overcome the drawbacks set out above and to provide a system for data transfer with a higher level of applicability. In accordance with this and other objects, the present invention relates to a system for data transfer through Internet/Intranet or similar communication networks including means for generating an aggregate mail object comprising a module of executable code that automatically is executed at the receiving end together with an associated module of data to perform tasks defined by the sender and/or to process or present data. The module of data is preferably embedded in the module of executable code to form an object. The executable code preferably should be independent of the platform used by the receiver. By including executable modules used to interpret and display the information the sender will control accurately how the information will appear at the receiver.

The module may include elements of a control program intended for a control unit or process computer that are executed automatically to perform control tasks in accordance with the associated data and/or a master process.

Further advantages are disclosed in the description below, in the claims and in the accompanying drawings.

DETAILED DESCRIPTION

Figure 1:
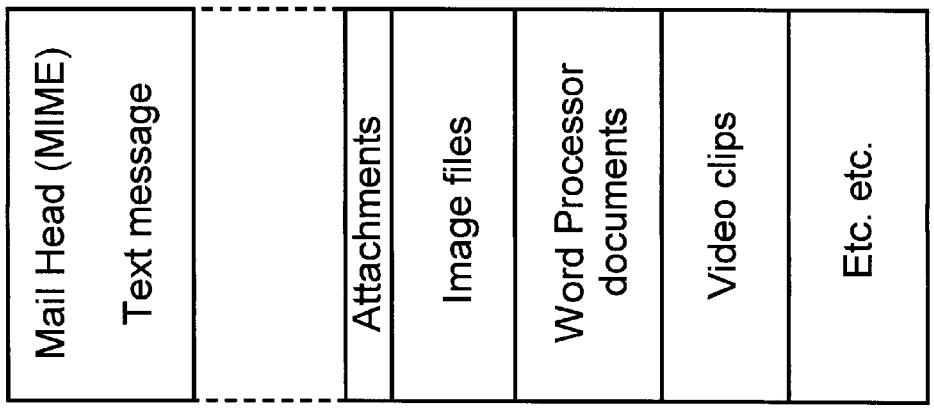
FIG. 1 shows a prior art mail structure.

In a prior art system an Internet Mail comprises a Mail Head including a text message and optionally one or a plurality of attachments. Each attachment normally is a data file associated to a computer program that is run by the recipient after receiving a mail object. Such an Internet Mail is shown in FIG. 1.

A Mail Head including a MIME structure is generated and included in a mail object. The Mail Head may include information such as the name or address of the sender, the subject of the Mail and the name or address of persons who will receive copies of the Mail. The name or address of at least on receiver should also be included. Text information of the mail is included in a Text Message section in the Mail Head. The mail object according to FIG. 1 further includes attachments, each of which normally being associated to an application software.

Figure 2:
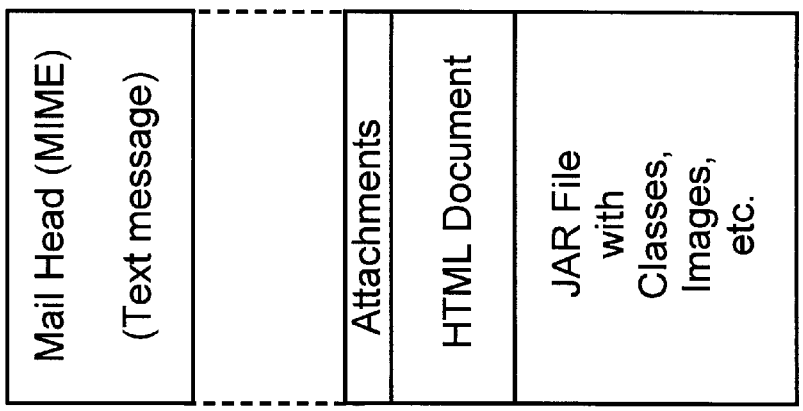
FIG. 2 shows one embodiment of a system according to the invention.

In a preferred embodiment means are provided for generating a complete Internet Mail. According to FIG. 2 such a mail object comprises a Mail Head comprising basically the same elements as the Mail Head according to FIG. 1. However, it is likely that the text message as such is omitted. Instead an attachment includes a Java section which is started from within a HTML document or a similar succeeding type such as XML. The HTML document will mainly act as a carrier to the Java section and it is automatically identified and interpreted by the receiving user agent (mail program). The Java section could be a part of a JAR file, and will be executed irrespective of the platform used by the receiver. A JAR file is a compressed file comprising other files, such as class files, images, sound files and/or data files. When a HTML document is used data files (text messages) should not be attached separately but instead be embedded in Java class files for safety reasons.

In the Java section there are included classes, images etc. and other objects, forming together an aggregate mail object. Each mail object may have a different design and purpose. It is possible to design mail objects to appear as post cards, business cards or similar documents. Normally, different standardised mail objects are available. The standardised mail objects may then be modified by the sender according to his preferences before the final preparations of the mail object.

A powerful feature is that the mail object displayed to the recipient may include interactive elements, such as buttons and other clickable elements. It would for instance be possible to prepare forms or similar documents that are filled in by the recipient and then returned as an E-mail to the sender. It is even possible to include in the Java section routines for processing data and making arrangements for an efficient transfer of data back to the sender (or other party) and a final processing of the data.

By including the software required to interpret and display the data or information the sender will control the interpretation of the data and also the display thereof. It is also possible to include complex information such as animations, video, multimedia. Functions such as encryption and other optional information can be used extensively.

The receiver may also be a processing system receiving in this way new or modified processing steps and/or processing data that are used and processed automatically.

Figure 3:
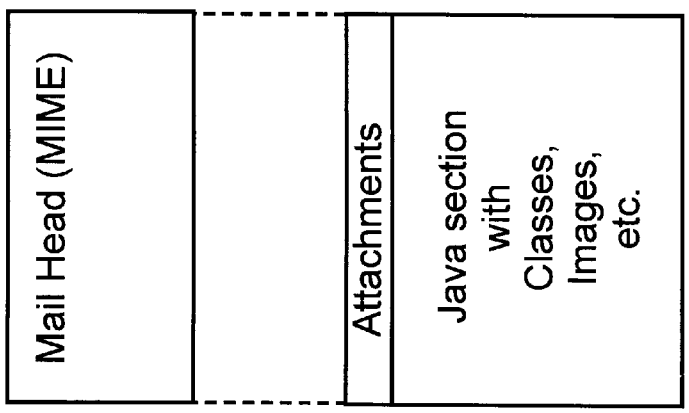
FIG. 3 shows an alternative embodiment according to the invention.

In a further developed system MIME will allow the use of Java Applications directly as attachments. FIG. 3 shows a mail object that will be used in such a developed system. Preferably the MIME standard is amended accordingly. By making one major amendment only further improvements and more complex methods and functions can be applied within the scope of the major amendment. In this case the HTML document is omitted and the user agent will identify the Java Application automatically and also launch it automatically. The developed system will allow the use of even more powerful objects.

The Java Application may also include methods that are called by the user agent before launching the main program and also during and after the execution of the main program. Such methods may include functions for a safety control of program modules, sender and sender identification, and starting and ending applications. Also the user agent may include functions that may be called by the mail object, such as saving an object to a file and transferring data to and from other programs. The user agent may act as an intermediary unit for objects and data between the mail object and other units of the receiver computer system. Normally, the user agent will also be responsible for checking viruses and other security tasks, and will perform also administrative tasks.

It is also possible to include further functions for checking the environment of the receiver before launching the main Application included in the Mail object. Then any sections of the executable code that are required to interpret the received information correctly may be collected and automatically through the Internet/intranet. Such sections may also be stored locally. It is possible also to return automatically an acknowledge message or other message to the sender.

What is claimed is:

1. A system for the transfer of data through Internet/Intranet comprising means for generating an Internet Mail including MIME content, said MIME content comprising:
   an address header;
   a MIME content header;
   at least one module of system independent executable code; and
   a section comprising data associated to said system independent executable code, and a user agent automatically starting the execution of said module of system independent executable code and additional executable code together with the associated data when receiving the Internet Mail, said user agent deriving, based upon said system independent executable code, said additional executable code, wherein said system independent executable code comprises a Java section and wherein said section comprising data is embedded together with said Java section in a common module.

2. The system according to claim 1, wherein a HTML object is included in said MIME content and said Java section comprises at least one Java applet that is started automatically when the HTML object is interpreted.

3. The system according to claim 1, wherein said Java section comprises at least one Java application that is started automatically when said Internet Mail is interpreted.

4. The system according to claim 1, wherein said section comprising data is embedded together with said Java section in Java objects.

5. The system according to claim 1, wherein said Java section comprises methods that are accessible to the user agent.

6. The system according to claim 1, wherein said Java section comprises methods that are stored locally to be accessible in subsequent transmission.

7. The system according to claim 1, wherein said Java section comprises methods for accessing a second Java section through the Internet/Intranet.

8. The system according to claim 1, wherein said Java section comprises methods for checking whether appropriate objects are available locally and downloading a second Java section through the Internet/Intranet when necessary.

* * * * *